(12) United States Patent
Gordon

(10) Patent No.: US 6,406,242 B1
(45) Date of Patent: Jun. 18, 2002

(54) APPARATUS FOR FASTENING TOGETHER TWO PLATES

(75) Inventor: Gary G. Gordon, Novi, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/710,046

(22) Filed: Nov. 10, 2000

(51) Int. Cl.[7] ............ F16B 19/00; F16B 21/18
(52) U.S. Cl. ............ 411/508; 411/513; 411/522; 411/913; 24/297
(58) Field of Search .................. 411/508, 509, 411/510, 513, 514, 533, 913; 24/297, 453

(56) References Cited

U.S. PATENT DOCUMENTS

| | | | | |
|---|---|---|---|---|
| 4,867,599 A | * | 9/1989 | Sasajima | 24/297 X |
| 5,289,621 A | * | 3/1994 | Kaneko | 411/522 X |
| 5,308,207 A | * | 5/1994 | Jaskowiak | 411/513 |
| 5,419,606 A | * | 5/1995 | Hull et al. | 24/297 X |
| 5,507,610 A | * | 4/1996 | Benedetti et al. | 411/509 X |

* cited by examiner

*Primary Examiner*—Neill Wilson
(74) *Attorney, Agent, or Firm*—Tarolli, Sundheim, Covell, Tummino & Szabo L.L.P.

(57) ABSTRACT

An apparatus (10) for securing a first plate, which may be a pull handle bracket, in a spaced relationship to a second plate, which may be a door panel. The apparatus (10) comprises a fastener (16) having a head portion (22) and a base portion (24). The head portion (22) is insertable into a hole in the first plate and supports the first plate. The base portion (24) is insertable into a hole in the second plate and attaches to the second plate. Part of the base portion (24) of the fastener (16) extends on a side of the second plate opposite the first plate. The apparatus (10) further includes a retainer (18) having an elongated main body (90) for inserting into the head portion (22) of the fastener (16) and for securing the first plate to the head portion (22) of the fastener (16). The part of the base portion (24) of the fastener (16) that extends on a side of the second plate opposite the first plate has a width that increases to resist a force attempting to separate the first plate from the second plate.

10 Claims, 5 Drawing Sheets

APPARATUS FOR FASTENING TOGETHER TWO PLATES

TECHNICAL FIELD

The present invention relates to an apparatus for securing a first plate in a spaced relationship to a second plate.

BACKGROUND OF THE INVENTION

A motor vehicle has doors. Each door has an outer panel that forms the exterior of the door and an inner panel. In the area between the outer panel and the inner panel, there is a cavity. The cavity may receive a window, and also may contain a power window mechanism for moving the window, a side impact occupant restraint system, etc. A pull handle for use by a passenger of the vehicle in closing the door is attached to the inner door panel. The pull handle is mounted on a bracket, and the bracket is mounted to the inner panel of the door. Currently, the pull handle bracket is mounted to the door panel by screws.

If maintenance to any of the equipment located within the cavity of the door is required, the pull handle bracket may need to be removed to allow access to the equipment. Currently, removing the pull handle bracket requires removing the screws. To replace the pull handle bracket after it is removed, the bracket must be aligned with the inner panel of the door such that the screw holes in the bracket align with the screw holes in the door panel and then, the screws are reinstalled. This process can be difficult as the screw holes in the door panel are not visible when the pull handle bracket is in place.

Further, the fasteners that attach the pull handle bracket to the door panel must be able to withstand the repeated force of the door being slammed shut. When the pull handle is used to slam the door, a force attempts to separate the pull handle bracket from the door panel. If the fasteners cannot withstand this repeated force, the pull handle bracket may become loosened or may be pulled off of the door panel.

Thus, there is a need for an apparatus to fasten a pull handle bracket to a door panel that will enable easy assembly, disassembly, and reassembly and that is capable of withstanding repeated slams of the door without the pull handle bracket becoming loosened from or being pulled off of the door panel.

SUMMARY OF THE INVENTION

This invention is an apparatus for securing a first plate, which may be a pull handle bracket, in a spaced relationship to a second plate, which may be a door panel. The apparatus comprises a fastener having a head portion and a base portion. The head portion is insertable into a hole in the first plate and supports the first plate. The base portion is insertable into a hole in the second plate and attaches to the second plate. Part of the base portion of the fastener extends on a side of the second plate opposite the first plate. The apparatus further includes a retainer having an elongated main body for inserting into the head portion of the fastener and for securing the first plate to the head portion of the fastener. The part of the base portion of the fastener that extends on a side of the second plate opposite the first plate has a width that increases to resist a force attempting to separate the first plate from the second plate.

BRIEF DESCRIPTION OF THE DRAWINGS

The foregoing and other features of the present invention will become apparent to those skilled in the art to which the present invention relates upon reading the following description with reference to the accompanying drawings, in which.

DESCRIPTION OF PREFERRED EMBODIMENT

Figure 1:
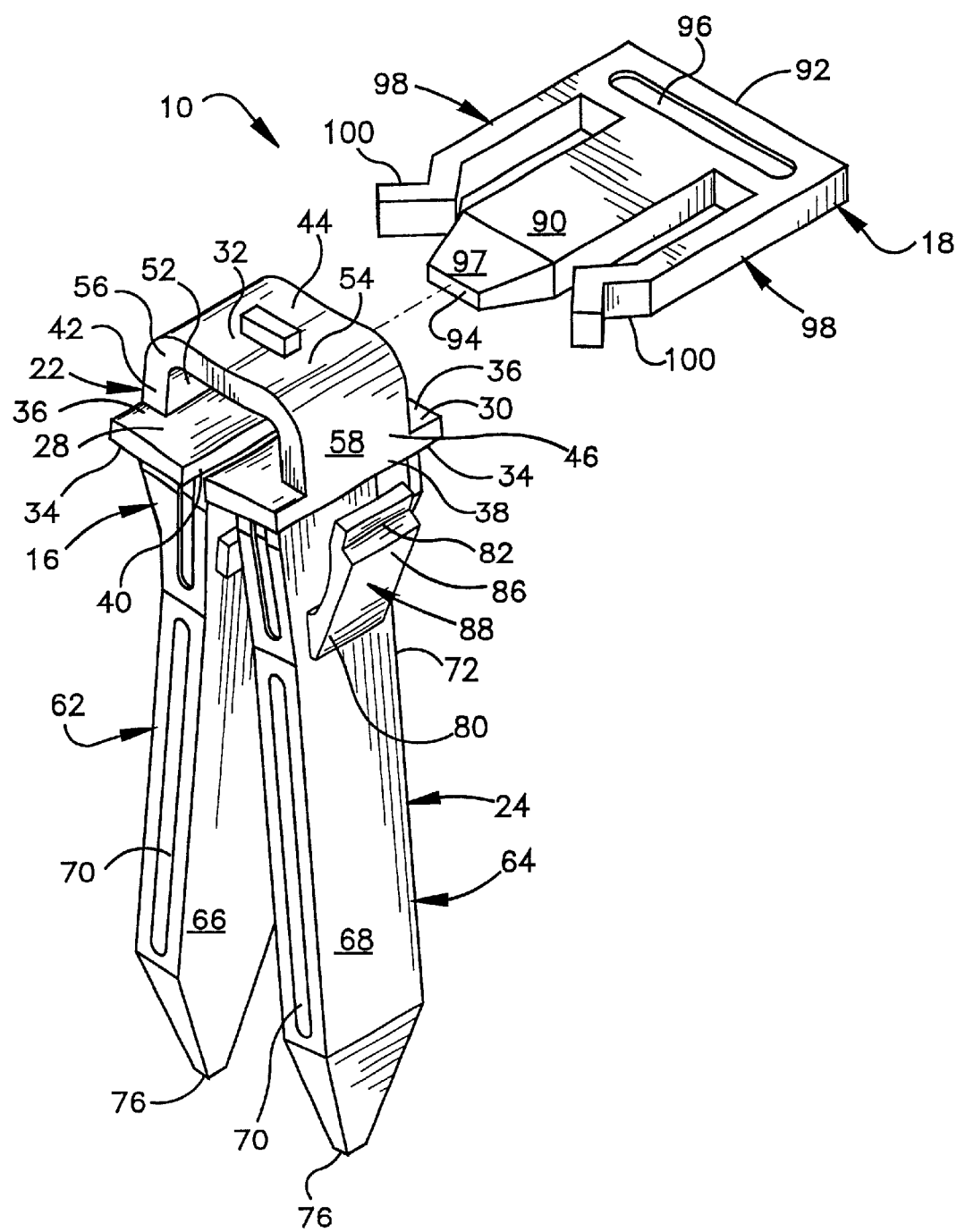
FIG. 1 is a perspective view of an apparatus embodying the present invention.

FIG. 1 shows a perspective view of the apparatus 10 of the invention. The apparatus 10 may be used for securing a first plate in a spaced relationship to a second plate. Throughout this application, the apparatus 10 will be discussed as securing a pull handle bracket 12 (FIG. 3) to a door panel 14. Those skilled in the art will recognize that the apparatus may be used to secure any two plates in a spaced relationship.

Figure 2:
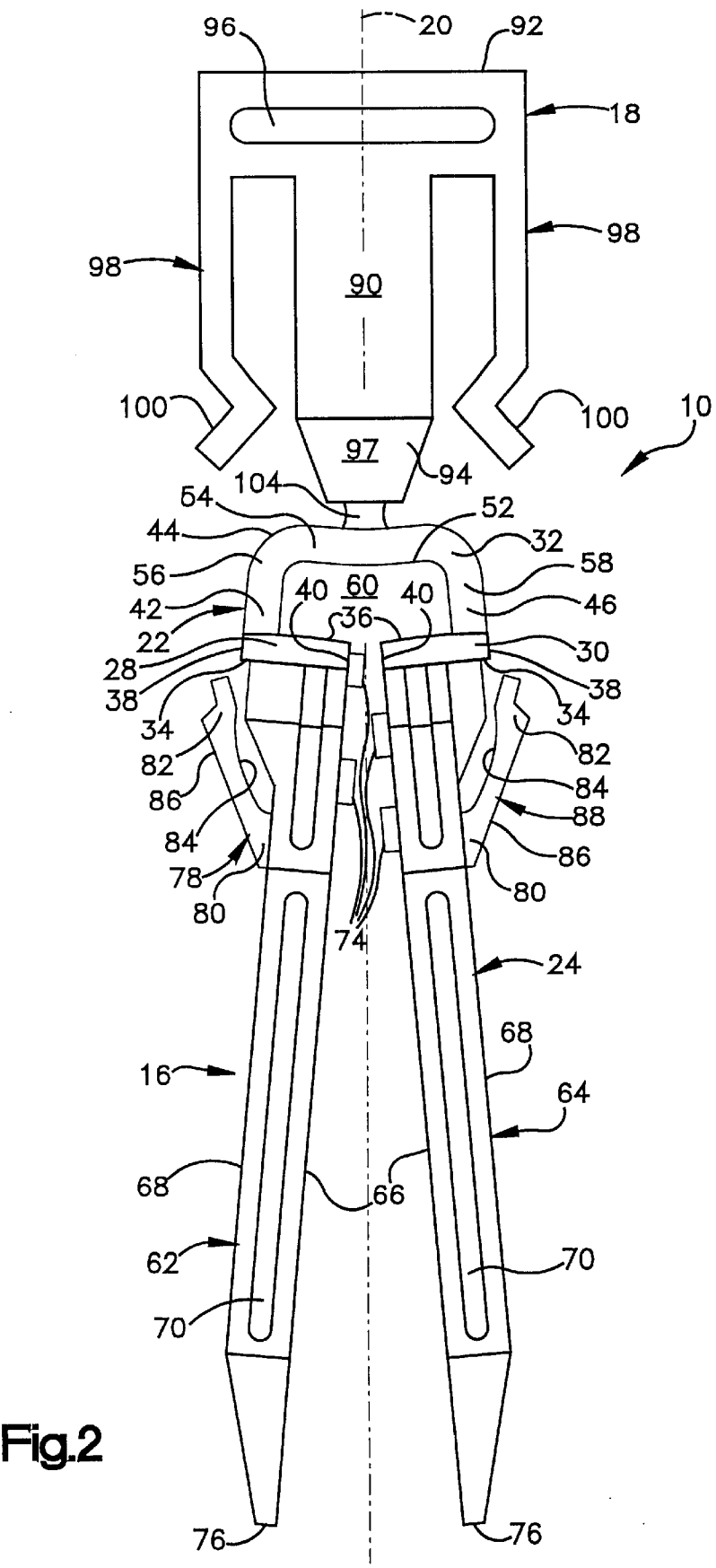
FIG. 2 is a side view of the apparatus embodying the present invention.

The apparatus 10 of the present invention comprises molded plastic parts 16 and 18. The parts 16 and 18 are molded as one piece, as shown in FIG. 2. When molded, the parts 16 and 18 are attached to each other along a longitudinal axis 20 that passes through the center of the apparatus 10. Preferably, the apparatus 10 is injection molded from a plastic material. The parts 16 and 18 are broken apart from one another for use, as shown in FIG. 1.

The part 16 is a fastener and the part 18 is a retainer. The fastener 16 has a head portion 22 and a base portion 24 (FIG. 1). The head portion 22 of the fastener 16 is insertable into a hole 26 (FIG. 3) in the pull handle bracket 12. The head portion 22 of the fastener 16 includes two flanges 28 and 30 and an arched portion 32. A first flange 28 is an elongated member having a depth that is approximately twice its width. The first flange 28 has a flat bottom surface 34 and a cambered upper surface 36. Both the bottom surface 34 and the upper surface 36 have a generally rectangular shape with beveled corners. As shown in FIG. 2, the camber of the upper surface 36 of the first flange 28 inclines along its width from an outer-side surface 38 to the center of the flange and then declines from the center of the flange to the inner-side surface 40. The camber of the upper surface 36 extends uniformly along the depth of the first flange 28. The second flange 30 is a mirror image of the first flange 28 and thus, the same reference numbers are used in identifying the parts of the second flange 30 that were used with regard to the first flange 28.

The arched portion 32 of the head portion 22 of the fastener 16 interconnects the first flange 28 and the second flange 30. A first end 42 of the arched portion 32 connects to the upper surface 36 of the first flange 28 near the outer-side surface 38 such that an outer surface 44 of the arched portion 32 is contiguous with the outer-side surface 38 of the first flange 28. A second end 46 of the arched portion 32 connects to the upper surface 36 of the second flange 30 near the outer-side surface 38 such that an outer surface 44 of the arched portion 32 is contiguous with the outer-side surface 38 of the second flange 30. As shown in FIG. 1, the arched portion 32 has a depth that is less than the depth of the first and the second flanges 28 and 30. The arched portion 32 connects to each flange 28 and 30 centrally along its depth such that a portion of each flange 28 and 30 extends in front of and behind the arched portion 32. The arched portion 32 has a width that is equal to twice the width of each flange 28 and 30 and a height that is sufficient to extend through the hole 26 in the pull handle bracket 12 and beyond an upper surface 48, as viewed in FIG. 3. Thus, when inserted into the hole 26 in the pull handle bracket 12 from a lower surface 50, the inner surface 52 of the arched portion 32 extends above the upper surface 48 of the pull handle bracket 12.

The arched portion 32 of the head portion 22 of the fastener 16 includes an upper portion 54 and two pedestals 56 and 58. The width of each pedestal 56 and 58 is approximately 30% of the width of each flange 28 and 30. The upper portion 54 of the arched portion 32 is flexible. In an initial position, where the head portion 22 is not subject to any outside forces, the upper portion 54 of the arched portion 32 bows downward slightly near the center of the upper portion 54, as shown in FIG. 2. This downward bow causes the pedestals 56 and 58 of the arched portion 32 to separate slightly causing the inner-side surface 40 of the first flange 28 to separate from the inner-side surface 40 of the second flange 30. When a pressure is exerted on the upper portion 54 of the arched portion 32 to straighten the upper portion 54, the first and the second flanges 28 and 30 move together such that the inner-side surface 40 of the first flange 28 is immediately adjacent the inner-side surface 40 of the second flange 30. When the first flange 28 is immediately adjacent the second flange 30, the two flanges 28 and 30 and the arched portion 32 form an opening 60 (FIG. 2).

The base portion 24 of the fastener 16 includes a first leg 62 and a second leg 64. The first leg 62 extends longitudinally from the first flange 28 in a direction opposite the arched portion 32 of the head portion 22 of the fastener 16. The first leg 62 has a height that is approximately five times the height of the arched portion 32. The first leg 62 has a rectangular cross-section with a width that is shorter than its depth (FIG. 1). The depth of the first leg 62 is approximately equal to the depth of the arched portion 32 of the head portion 22. The width of the first leg 62 is less than the width of the first flange 28 (FIG. 2).

The first leg 62 has an inner surface 66, an outer surface 68, a front surface 70, and a rear surface (not shown). The inner surface 66 of the first leg 62 connects to and is contiguous with the inner-side surface 40 of the first flange 28. A plurality of protrusions 74 extends outwardly from the inner surface 66 of the first leg 62 for interlocking with the second leg 64. The outer surface 68 of the first leg 62 extends from the first flange 28 parallel to the inner surface 66 for approximately 80 percent of the height of the first leg 62. The outer surface 68 of the first leg 62 then tapers toward the inner surface 66 as it nears an end opposite the first flange 28. The front surface 70 and the rear surface of the first leg 62 extend parallel to one another and perpendicular to the inner surface 66 and outer surface 68 for approximately 80 percent of the height of the first leg 62. At the end of the first leg 62 opposite the first flange 28, the front and rear surfaces 70 and 72 both taper inwardly. Thus, the inner, outer, front, and rear surfaces 66, 68, 70 and 72 of the first leg 62 meet at a point 76 on an end opposite the first flange 28.

Figure 3:
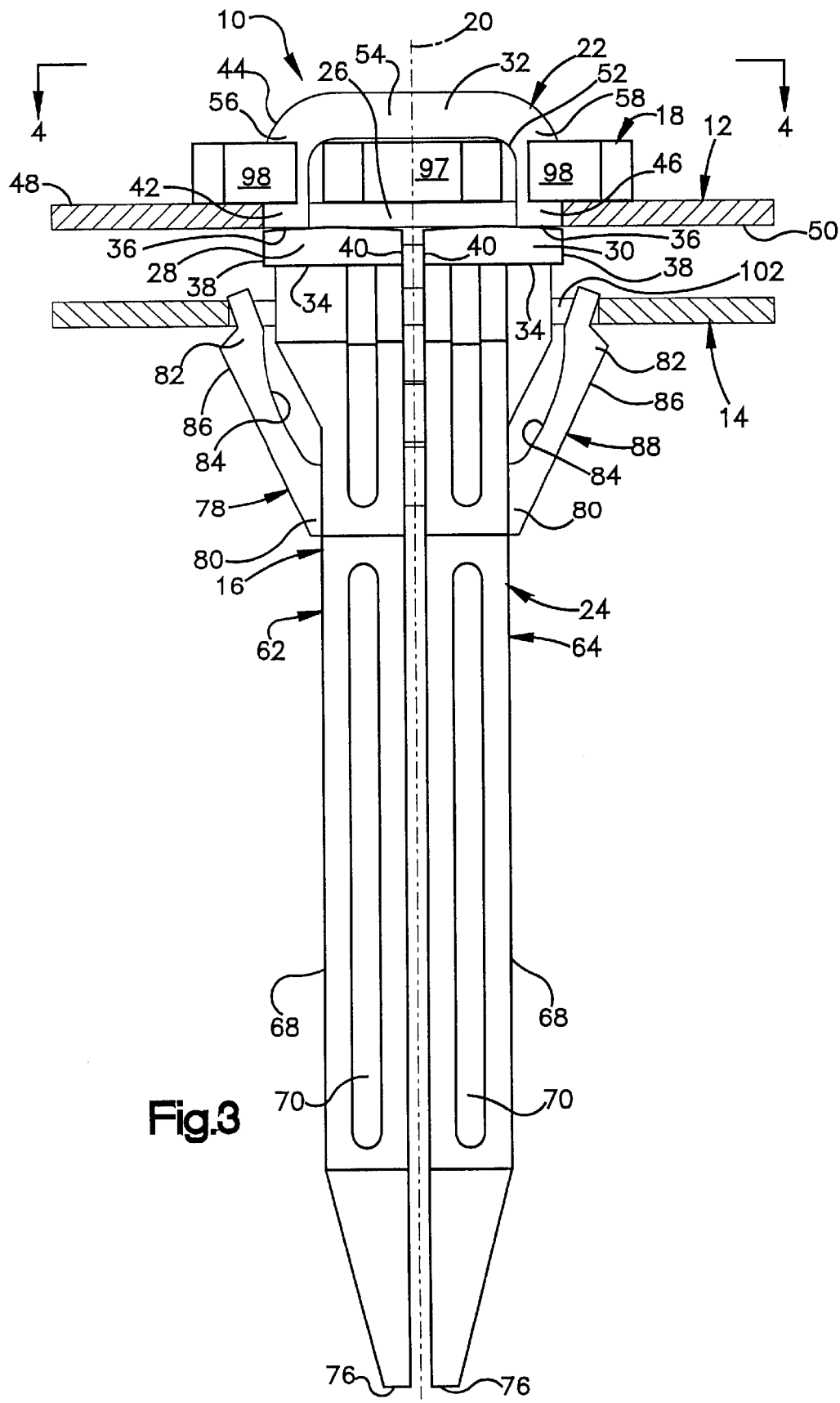
FIG. 3 is a side view of the apparatus embodying the present invention showing the apparatus securing a first plate in a spaced relationship to a second plate.

A first support flange 78 extends from the outer surface 68 of the first leg 62. The first support flange 78 extends both outwardly and longitudinally toward the first flange 28 of the head portion 22 of the fastener 16. The first support flange 78 is cantilevered such that a first end 80 is connected to the outer surface 68 of the first leg 62 and a second end 82 is suspended away from the first leg 62. The first end 80 of the first support flange 78 is connected to the outer surface 68 of the first leg 62 at a location approximately 25 percent of the height of the first leg 62 from the first flange 28. The first support flange 78 has an inner surface 84 that is nearest the outer surface 68 of the first leg 62 and an outer surface 86 opposite the inner surface 84. The outer surface 86 of the first support flange 78 is notched at the second end 82 for clamping onto the door panel 14, as shown in FIG. 3. The second end 82 of the first support flange 78 is located laterally outside the outer-side surface 38 of the first flange 28 and longitudinally below the bottom surface 34 of the first flange 28, as viewed in FIGS. 2 and 3. The first support flange 78 is flexible such that the second end 82 may be moved toward the outer surface 68 of the first leg 62.

The second leg 64 is a mirror image of the first leg 62 and as such the same reference numbers are used in identifying the parts of the second leg 64 that were used with regard to the first leg 62. The second leg 64 extends longitudinally from the second flange 30 in a direction opposite the arched portion 32 of the head portion 22 of the fastener 16. The second leg 64 has a height that is approximately five times the height of the arched portion 32. The second leg 64 has a rectangular cross-section with a width that is shorter than its depth (FIG. 1). The depth of the second leg 64 is approximately equal to the depth of the arched portion 32 of the head portion 22. The width of the second leg 64 is less than the width of the second flange 30 (FIG. 2).

The second leg 64 has an inner surface 66, an outer surface 68, a front surface 70, and a rear surface 72. The inner surface 66 of the second leg 64 connects to and is contiguous with the inner-side surface 40 of the second flange 30. A plurality of protrusions 74 extends outwardly from the inner surface 66 of the second leg 64 for interlocking with the protrusions 74 on the first leg 62. The outer surface 68 of the second leg 64 extends from the second flange 30 parallel to the inner surface 66 for approximately 80 percent of the height of the second leg 64. The second leg 64 then tapers toward the inner surface 66 as it nears an end opposite the second flange 30. The front surface 70 and the rear surface 72 of the second leg 64 extend parallel to one another and perpendicular to the inner surface 66 and outer surface 68 for approximately 80 percent of the height of the second leg 64. At the end of the second leg 64 opposite the second flange 30, the front and rear surfaces 70 and 72 both taper inwardly. Thus, the inner, outer, front, and rear surfaces 66, 68, 70 and 72 of the second leg 64 meet at a point 76 on an end opposite the second flange 30.

A second support flange 88 extends from the outer surface 68 of the second leg 64. The second support flange 88 extends both outwardly and longitudinally toward the second flange 30. The second support flange 88 is cantilevered such that a first end 80 is connected to the outer surface 68 of the second leg 64 and a second end 82 is suspended from the second leg 64. The first end 80 of the second support flange 88 is connected to the outer surface 68 of the second leg 64 at a location approximately 25 percent of the height of the second leg 64 from the second flange 30. The second support flange 88 has an inner surface 84 that is nearest the outer surface 68 of the second leg 64 and an outer surface 86 opposite the inner surface 84. The outer surface 86 of the second support flange 88 is notched at the second end 82 for clamping onto the door panel 14 (FIG. 3). The second end 82 of the second support flange 88 is located laterally outside the outer-side surface 38 of the second flange 30 and longitudinally below the bottom surface 34 of the second flange 30, as viewed in FIGS. 2 and 3. The second support flange 88 is flexible such that the second end 82 may be moved toward the outer surface 68 of the second leg 64.

When the arched portion 32 of the head portion 22 of the fastener 16 is bowed such that the first and second flanges 28 and 30 are separated, the first and the second legs 62 and 64 are separates as shown in FIG. 2. When the arched portion 32 is straightened such that the first and second flanges 28 and 30 come together, the first and second legs 62 and 64 come together as shown in FIG. 3. When the first and second legs 62 and 64 come together, the protrusions 74 of the inner surface 66 of the first leg 62 interlock with the protrusions 74 on the inner surface 66 of the second leg 64.

The apparatus 10 of the present invention also includes a retainer 18 (FIG. 1). The retainer 18 has an elongated main body 90. The elongated main body 90 of the retainer 18 has a width that is narrow enough to fit into the opening 60 of the arched portion 32 of the head portion 22 of the fastener 16. The elongated main body 90 of the retainer 18 has a length that is longer than the depth of the arched portion 32 (FIG. 1). The elongated main body 90 of the retainer 18 has two ends 92 and 94. A first end 92 has a width that is approximately twice the width of the elongated main body 90. The first end 92 has an elongated slot 96 that extends through the retainer 18 perpendicular to the elongated main body 90. The second end 94 of the elongated main body 90 is tapered inwardly to form a narrow tongue 97 for simplifying insertion of the elongated main body 90 into the opening 60 formed in the arched portion 32 of the head portion 22 of the fastener 18.

The retainer 18 further includes two retaining legs 98. The retaining legs 98 extend from the first end 92 of the retainer 18 toward the second end 94 of the elongated main body 90. One retaining leg 98 is located on each side of the elongated main body 90. Each retaining leg 98 has a length that is approximately equal to the length of the elongated main body 90. Each retaining leg 98 curves toward the elongated main body 90 as it nears the second end 94 of the elongated main body 90 of the retainer 18. As shown in FIG. 2, the curved end 100 of each retaining leg has a V-shape with the narrow part of the V-shape extending toward the elongated main body 90. The retaining legs 98 help to retain the connection of the retainer 18 to the fastener 16 as will be described in more detail below.

The pull handle bracket 12 and the door panel 14 that are secured by the fastener 16 and the retainer 18 each have at least one hole 26 and 102 (FIG. 3). Preferably, both the pull handle bracket 12 and the door panel 14 have two holes. Each hole 26 in the pull handle bracket 12 aligns with and corresponds to a hole 102 in the door panel 14. Preferably, each hole 26 and 102 is rectangular.

Figure 4:
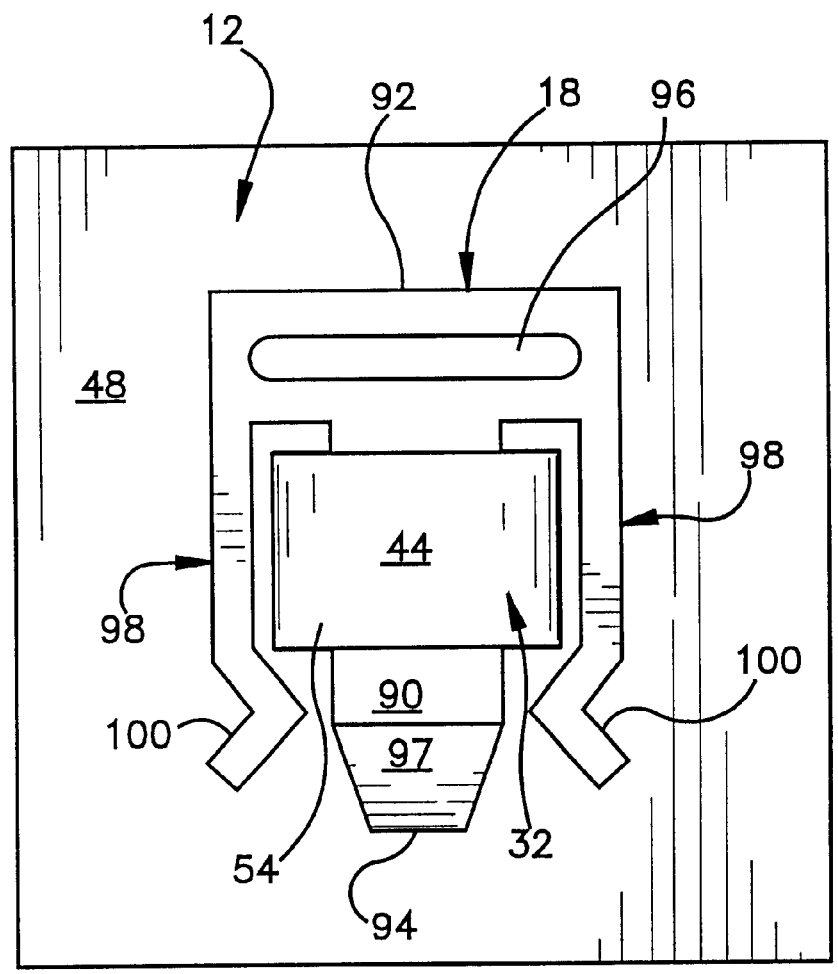
FIG. 4 is a view of the apparatus embodying the present invention taken along line 4—4 in FIG. 3.

To attach the pull handle bracket 12 to the door panel 14, the retainer 18 must first be broken off of the fastener 16. When molded as one piece, a narrow assembly 104 (FIG. 2) connects the retainer 18 to the fastener 16. Twisting the retainer 18 relative to the fastener 16 will break this assembly 104. After removing the retainer 18 from the fastener 16, the arched portion 32 of the head portion 22 of the fastener 16 is inserted into the hole 26 in the pull handle bracket 12. The arched portion 32 is inserted until a lower surface 50, as viewed in FIG. 3, of the pull handle bracket 12 rests on and is supported by the upper surface 36 of the first and the second flanges 28 and 30. The first and the second legs 62 and 64 of the base portion 24 of the fastener 16 are then pushed together. Pushing together the legs 62 and 64 causes the upper portion 54 of the arched portion 32 to straighten. The elongated main body 90 of the retainer 18 is then inserted into the opening 60 of the arched portion 32 such that it rests on the upper surface 48 of the pull handle bracket 12, as shown in FIG. 4. When inserting the retainer 18, the tongue 97 of the elongated main body 90 is inserted first and the elongated main body 90 is pushed into the opening 60 until the retainer legs 98 snap around the outer surface 44 of the arched portion 32, as shown in FIGS. 3 and 4. The retainer legs 98 secure the retainer 18 in place on the fastener 16 and prevent the elongated main body 90 from being removed by vibration. When the elongated main body 90 of the retainer 18 is inserted into the opening 60, the elongated main body 90 applies sufficient resistance to the upper portion 54 of the arched portion 32 to keep the upper portion 54 of the arched portion 32 from bowing. Thus, the retainer 18 keeps the first leg 62 and the second leg 64 of the base portion 24 of the fastener 16 together. By attaching the retainer 18 to the fastener 16, the pull handle bracket 12 becomes secured to the fastener 16.

Next, the fastener 16 is aligned with a hole 102 in the door panel 14 and the point 76 of each leg 62 and 64 of the base portion 24 of the fastener 16 is inserted into the hole 102 in the door panel 14. The base portion 24 of the fastener 16 is pushed into the hole 102 until the first and second support flanges 78 and 88 bend inward, toward the outer surface 68 of the respective leg 62 or 64, and the notched second end 82 of each support flange 78 and 88 attaches to the door panel 14, as shown in FIG. 3. The notched second ends 82 of the support flanges 78 and 88 attach the door panel 14 to the base portion 24 of the fastener 16. When the support flanges 78 and 88 attached to the door panel 14, the legs 62 and 64 of the base portion 24 of the fastener 16 are suspended through the center of the hole 102 in the door panel 14. When the door panel 14 is attached to the base portion 24 of the fastener 16, the door panel 14 is held in a spaced relationship to the pull handle bracket 12.

To disassemble the pull handle bracket 12 from the door panel 14, the retainer 18 is removed from the head portion 22 of the fastener 16. To remove the retainer 18, a flat head of a screwdriver can be inserted into the slot 96 in the first end 92 of the retainer 18 and the retainer 18 pulled out of the arched portion 32. When pulling the retainer 18 out of the opening 60 of the arched portion 32 of the fastener 16, enough force must be exerted on the retainer 18 to cause the retaining legs 98 to resiliently expand over the outer surface 44 of the arched portion 32. After the retainer 18 is removed, the pull handle bracket 12 can be pulled off of the arched portion 32 of the fastener 16 to provide access to the door panel 14 or the cavity of the door. During this time, the base portion 24 of the fastener 16 remains inserted in the hole 102 in the door panel 14 and clamped to the door panel 14 by the support flanges 78 and 88.

To reinstall the pull handle bracket 12, the pull handle bracket 12 is aligned with the fastener 16 that remained attached to the door panel 14. The arched portion 32 of the fastener 16 is reinserted into the respective hole 26 in the pull handle bracket 12 and the retainer 18 is reinstalled into the opening 60 of the arched portion 32 of the head portion 22 of the fastener 16. When the pull handle bracket 12 is removed, the interlocking protrusions 74 on the inner surface 66 of the legs 62 and 64 of the base portion 24 provide sufficient friction to hold the legs 62 and 64 together.

Figure 5:
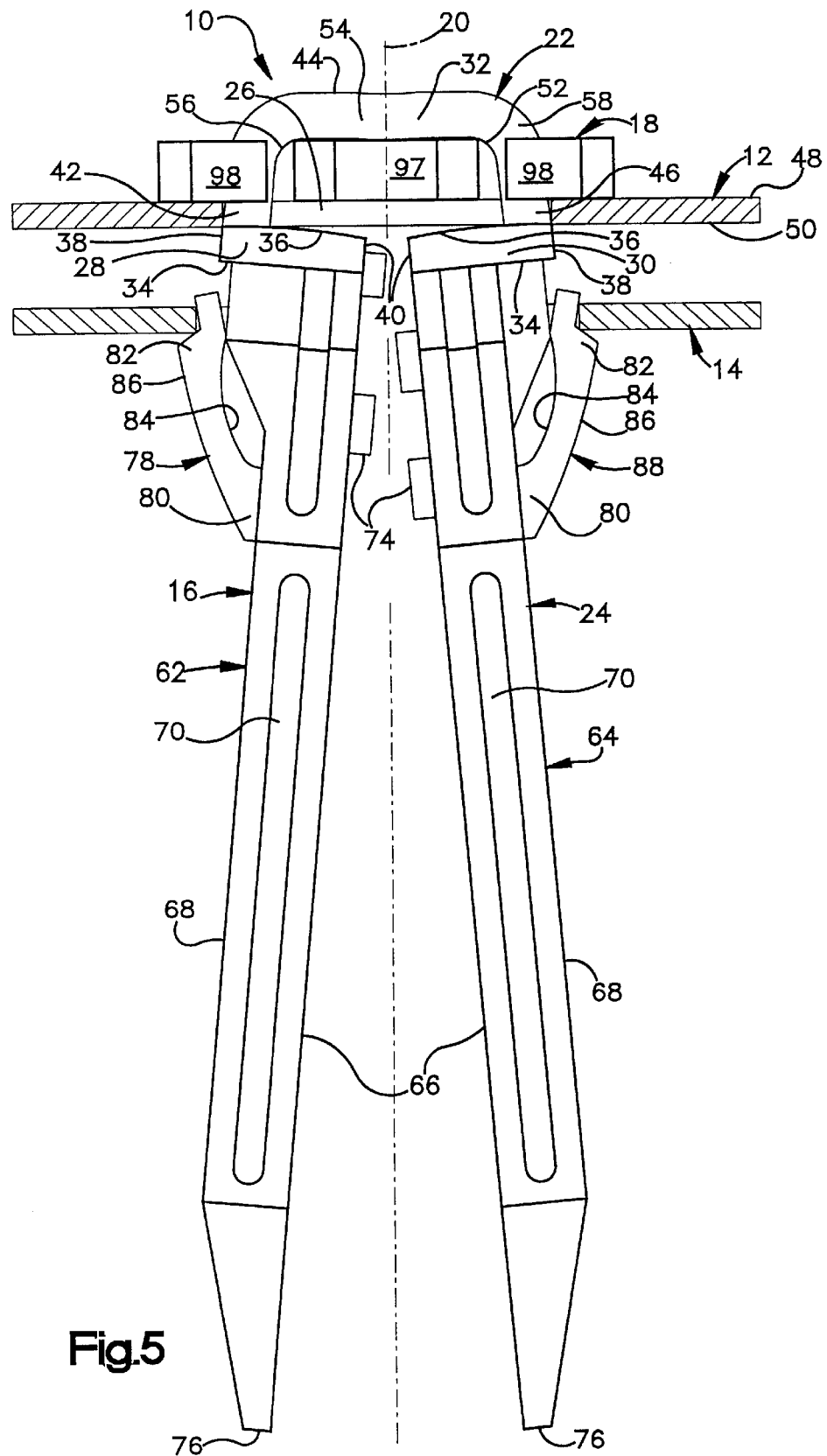
FIG. 5 is a side view of the apparatus embodying the present invention showing the apparatus subjected to a force attempting to separate the first plate from the second plate.

When the pull handle bracket 12 is attached to the door panel 14, the fastener 16 and the retainer 18 resist forces attempting to separate the pull handle bracket 12 and the door panel 14. When a force is applied to the pull handle bracket 12 pulling the pull handle bracket 12 in a direction away from the door panel 14, the base portion 24 of the fastener 16 widens, as shown in FIG. 5, to resist separation of the pull handle bracket 12 and the door panel 14. The force on the pull handle bracket 12 is transferred through the elongated main body 90 of the retainer 18 to the arched portion 32 of the fastener 16. The pedestals 56 and 58 of the arched portion 32 are pulled in the direction of the force. Since the pedestals 56 and 58 are connected to the outer-side surfaces 38 of the respective flanges 28 and 30, the outer-side surfaces 38 of the flanges are pulled upward toward the lower surface 50 of the pull handle bracket 12. As a result, the contact between the respective flanges 28 and 30 and the lower surface 50 of the pull handle bracket 12 rolls on the cambered upper surface 36 of the flanges 28 and 30 toward the outer-side surface 38 of the flanges 28 and 30. This action causes the first leg 62 and the second leg 64, which are suspended through the hole 102 in the door panel 14, to separate, as shown in FIG. 5, to resist separation of the pull handle bracket 12 and the door panel 14. When the force is released, the center of the cambered upper surface 36 of each flange 28 and 30 supports the pull handle bracket 12 and the respective legs 62 and 64 of the base portion 24 of the fastener 16 return to their closed position. The interlocking protrusions 74 on the inner surfaces 66 of the respective legs 62 and 64 of the base portion 24 of fastener 16 provide some resistance to the separation of the respective legs 62 and 64. Thus, the protrusions 74 prevent separation of the legs 62 and 64 if the force is less than a predetermined value sufficient to overcome the frictional force of the protrusions 74.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for securing a first plate in a spaced relationship to a second plate comprising:
   a fastener having a head portion and a base portion, the head portion being insertable into a hole in the first plate and supporting the first plate, the base portion being insertable into a hole in the plate and attaching to the second plate, part of the base portion of the fastener extending on a side of the second plate opposite the first plate; and
   a retainer having an elongated main body for inserting into the head portion of the fastener and for securing the first plate to-the head portion of the fastener;
   the part of the base portion of the fastener that extends on a side of the second plate opposite the first plate having a width that increases to resist a force attempting to separate the first plate from the second plate;
   the head portion of the fastener including a first flange, a second flange, and an arched portion, the arched portion interconnecting the first and second flange and having a depth that is narrower than a depth of the respective flanges.

2. The apparatus as in claim 1 further being defined by:
the base portion of the fastener including a first leg and a second leg, the first leg extending from the first flange in a direction opposite the arched portion and the second leg extending from the second flange in a direction opposite the arched portion.

3. The apparatus as in claim 2 further being defined by:
both the first leg and the second leg of the base portion of the fastener having an inner surface, the inner surface of the first leg having protrusions for interlocking with protrusions of the second leg.

4. The apparatus as in claim 2 further being defined by:
both the first leg and the second leg of the base portion of the fastener having an outer surface, the outer surface of each leg having a support flange, each support flange tapering outward from the outer surface of the respective leg and in a direction toward the head portion of the fastener.

5. The apparatus as in claim 4 further being defined by:
the support flange on each leg of the fastener having a notched end for attaching to the second plate.

6. The apparatus as in claim 1 further being defined by:
both the first flange and the second flange having a cambered upper surface, the arched portion connecting to each flange at an outer end of the cambered upper surface.

7. An apparatus for securing a first plate in a spaced relationship to a second plate comprising:
   a fastener having a head portion and a base portion, the head portion being insertable into a hole in the first plate and supporting the first plate, the base portion being insertable into a hole in the second plate and attaching to the second plate, part of the base portion of the fastener extending on a side of the second plate opposite the first plate; and
   a retainer having an elongated main body for inserting into the head portion of the fastener and for securing the first plate to the head portion of the fastener;
   the part of the base portion of the fastener that extends on a side of the second plate opposite the first plate having a width that increases to resist a force attempting to separate the first plate from the second plate;
   the base portion having first and second legs movable relative to each other and first and second flanges extending from the first and second legs, the first and second flanges being movable relative to the first and second legs, the first and second legs moving away from each other to resist the force attempting to separate the first plate from the second plate.

8. An apparatus for securing a first plate in a spaced relationship to a second plate comprising:
   a fastener having a head portion and a base portion, the head portion being insertable into a hole in the first plate and supporting the first plate, the base portion being insertable into a hole in the second plate and attaching to the second plate, part of the base portion of the fastener extending on a side of the second plate opposite the first plate; and
   a retainer having an elongated main body for inserting into the head portion of the fastener and for securing the first plate to the head portion of the fastener;
   the part of the base portion of the fastener that extends on a side of the second plate opposite the first plate having a width that increases to resist a force attempting to separate the first plate from the second plate;
   the elongated main body of the retainer having a slotted end, the slotted end having a width that is greater than a width of the elongated main body, two retaining legs extending from the slotted end, each retaining leg curving toward the elongated main body as the respective retaining leg approaches an end opposite the slotted end.

9. An apparatus for securing a first plate in a spaced relationship to a second plate comprising:
   a fastener having a head portion and a base portion, the head portion being insertable into a hole in the first plate and supporting the first plate, the base portion being insertable into a hole in the second plate and attaching to the second plate, part of the base portion of the fastener extending on a side of the second plate opposite the first plate; and a retainer having an elongated main body for inserting into the head portion of the fastener and for securing the first plate to the head portion of the fastener;

the part of the base portion of the fastener that extends on a side of the second plate opposite the first plate having a width that increases to resist a force attempting to separate the first plate from the second plate;

the fastener and the retainer being made of the same material and being molded as one piece.

10. An apparatus for securing a first plate in a spaced relationship to a second plate comprising:

a fastener having a head portion and a base portion, the head portion being insertable into a hole in the first plate and supporting the first plate, the base portion being insertable into a hole in the second plate and attaching to the second plate, part of the base portion of the fastener extending on a side of the second plate opposite the first plate; and a retainer having an elongated main body for inserting into the head portion of the fastener and for securing the first plate to the head portion of the fastener;

the part of the base portion of the fastener that extends on a side of the second plate opposite the first plate having a width that increases to resist a force attempting to separate the first plate from the second plate;

the first plate being a pull handle bracket and the second plate being a door panel for a motor vehicle.

* * * * *